United States Patent [19]
DeLuca

[11] Patent Number: 5,432,839
[45] Date of Patent: Jul. 11, 1995

[54] METHOD AND APPARATUS FOR FORWARDING SELECTIVE CALL MESSAGES RECEIVED IN A FIRST SELECTIVE CALL SERVICE TO A SECOND SELECTIVE CALL SERVICE

[75] Inventor: Michael J. DeLuca, Boca Raton, Fla.

[73] Assignee: Motorola, Inc., Schaumburg, Ill.

[21] Appl. No.: 178,596

[22] Filed: Jan. 7, 1994

Related U.S. Application Data

[63] Continuation of Ser. No. 937,339, Aug. 31, 1992, abandoned.

[51] Int. Cl.⁶ .................................. H04M 11/00
[52] U.S. Cl. .................................. 379/57; 455/11.1
[58] Field of Search ............... 379/56, 57, 63; 340/311.1, 825.44; 455/11.1, 38.1

[56] References Cited

U.S. PATENT DOCUMENTS

| | | |
|---|---|---|
| 4,178,476 | 12/1979 | Frost . |
| 4,506,384 | 3/1985 | Lucas . |
| 4,661,972 | 4/1987 | Kai . |
| 4,814,763 | 3/1989 | Nelson et al. . |
| 4,868,562 | 9/1989 | Andros et al. . |
| 4,906,989 | 3/1990 | Kasugai .................. 379/57 X |
| 4,926,460 | 5/1990 | Gutman et al. . |
| 4,928,096 | 5/1990 | Leonardo et al. . |
| 4,951,044 | 8/1990 | Nelson et al. . |
| 5,047,763 | 9/1991 | Kuznicki et al. .......... 379/57 X |
| 5,237,321 | 8/1993 | Oliwa ..................... 340/825.44 |

Primary Examiner—Curtis Kuntz
Assistant Examiner—G. J. Dehling
Attorney, Agent, or Firm—Kelly A. Gardner; John H. Moore

[57] ABSTRACT

A method, in a repeater (155) having receiving circuitry (310, 315) for selectively receiving and decoding a selective call message transmitted by a first selective call service (105) and further coupled to a telephone network (135), for forwarding received information to a second selective call service (110) comprises the step of transferring, over the telephone network (135), message information selectively received from the first selective call service (105) to the second selective call service (110).

8 Claims, 3 Drawing Sheets

METHOD AND APPARATUS FOR FORWARDING SELECTIVE CALL MESSAGES RECEIVED IN A FIRST SELECTIVE CALL SERVICE TO A SECOND SELECTIVE CALL SERVICE

This is a continuation of application Ser. No. 07/937,339, filed Aug. 31, 1992, now abandoned.

FIELD OF THE INVENTION

This invention relates in general to selective call messaging, and more specifically to a selective call system in which messages received by a personal paging repeater in a first selective call service may be forwarded to a second selective call service for retransmission.

BACKGROUND OF THE INVENTION

Selective call systems of today are utilized to transmit messages to voice or data communication receivers, i.e., pagers, carried by people who may not always be accessible by telephone. Some selective call systems, commonly known as wide area paging services, transmit messages to subscribers within a large geographic area. Wide area paging services meet the needs of subscribers, such as sales or service people, who are constantly traveling within a large area. Other selective call systems, called local area or on-site paging services, transmit messages within a localized area. This type of paging service is designed to transmit messages to people who are frequently away from their desks but seldom leave their campus, e.g., the factory, office, hospital, etc., in which they work. Each paging service, whether wide area or on-site, is assigned a unique frequency, i.e., channel, in a manner such that systems proximally located to each other will operate on distinct channels, thereby preventing interference between different paging services.

With the proliferation of selective call messaging, many users subscribe to more than one paging service. For example, a user who travels frequently may subscribe to a wide area paging service to receive messages while traveling and subscribe to an on-site paging service to receive messages while on campus. Doctors, for instance, may need the services of a wide area paging service while on call and may need the services of an on-site paging service while at work in the hospital. A subscriber to more than one paging service, however, must have a pager for each paging service to which he subscribes. Therefore, a subscriber of more than one paging service must typically purchase or rent multiple pagers, which are often very expensive. Furthermore, if the subscriber wishes to receive messages on more than one paging service at the same time, he must carry a pager for each of the paging services in which he desires to receive messages. In such a situation, the subscriber is faced with the problem of how to wear a number of often bulky and unattractive pagers while maintaining a dignified appearance. Furthermore, if the paging services do not have overlapping coverage areas, the subscriber will not be able to receive messages broadcast by the paging services at the same time even if he carries a pager for each paging service. In this case, he can only receive messages from each paging service while he is located within the coverage area of the paging service. Therefore, the subscriber may often not receive messages broadcast by a first paging service while he is in the coverage area of a second paging service. For example, a sales person who constantly travels between two different cities may subscribe to two paging services, each providing coverage for one of the two cities. He will, however, only receive messages broadcast by each of the paging services while he is within the coverage area of each paging service. As a result, while he is in the first city, the sales person will miss messages broadcast by the paging service covering the second city.

Thus, what is needed is a method by which a subscriber of multiple paging services having unique coverage areas may automatically receive messages broadcast by each of the multiple paging services at all times. Furthermore, the subscriber should be able to receive the messages broadcast by each of the multiple paging services on a single pager.

SUMMARY OF THE INVENTION

A communication system comprises a first selective call service having a first coverage area in which a first selective call message is transmitted and a paging repeater located within the first coverage area for receiving and decoding the first selective call message to recover a first address and message information included therein. The paging repeater automatically transfers the message information and a second address over a telephone network in response to determining that the first address is equivalent to a predetermined address stored by the paging repeater. Also, the paging repeater can be physically relocated by the user. The paging repeater comprises means for connecting to and disconnecting from the telephone network by the user.

The communication system further includes a second selective call service for receiving the message information and the second address from the telephone network and encoding the message information and the second address into a second selective call message for transmission within a second coverage area.

The paging repeater comprises a receiver for receiving the first selective call message, a decoder coupled to the receiver for decoding the first selective call message to recover the first address and the message information included therein, and a memory coupled to the decoder for storing the predetermined address, the second address, and a predetermined telephone number. Comparing circuitry compares the first address to the predetermined address and telephone accessing circuitry dials the predetermined telephone number and transfers the second address and message information over the telephone network in response to the comparing circuitry determining that the first address is equivalent to the predetermined address. The telephone accessing circuitry can be disconnected from and recoupled to the telephone network by the user such that the paging repeater can be moved between different locations and connected to the telephone network at the different locations.

DESCRIPTION OF A PREFERRED EMBODIMENT

Figure 1:
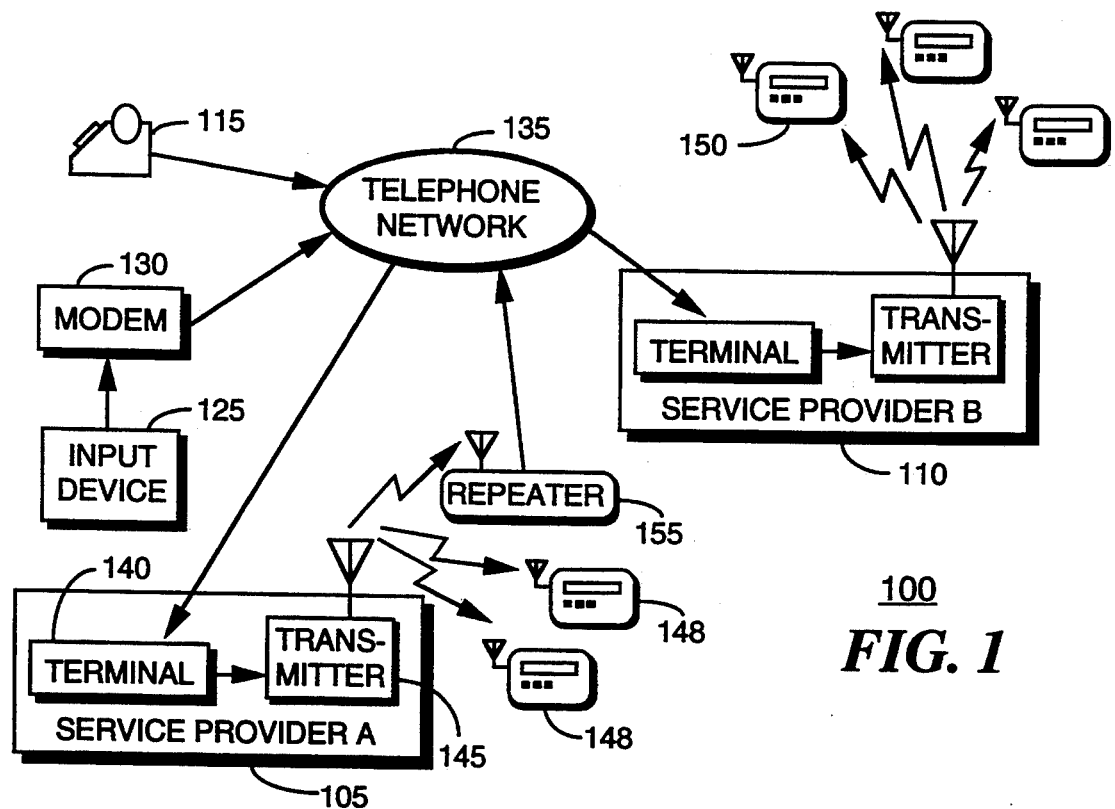
FIG. 1 is a block diagram of a selective call system having a first selective call service provider and a second selective call service provider in accordance with a preferred embodiment of the present invention.

Referring to FIG. 1, a selective call system 100, in accordance with a preferred embodiment of the present invention, comprises at least a first selective call service provider, for example, service provider A 105, and a second selective call service provider, for example, selective call service provider B 110, which transmit selective call messages to subscribers located within corresponding coverage areas.

Message information, such as numeric or voice information, included in a selective call message may be received from a telephone 115. Additionally, the message information may be received from another input device 125, e.g., a personal computer or electronic mail service, via a modem 130 as numeric or alphanumeric information. Prior to entering the message information, however, a telephone number corresponding to a selected service provider, e.g., service provider A 105, is preferably dialed to couple the telephone 115 or input device 125 to the selected service provider through a telephone network 135, such as the public switched telephone network (PSTN) or a private telephone network. When the message information is received by the selected service provider, the message information is encoded into a selective call message by a terminal 140. The selective call message is then transmitted at a unique frequency in a given geographic area by a transmitter 145 for reception by data communication receivers 148, e.g., pagers, programmed to receive selective call messages broadcast by the selected service provider.

In accordance with the preferred embodiment of the present invention, a subscriber of multiple service providers may receive selective call messages broadcast by each of the service providers on a single pager. This is accomplished by utilizing a personal paging repeater 155 to receive selective call messages broadcast by a first service provider, for example, service provider A 105. The personal paging repeater 155 then forwards the selective call messages to a second service provider, for example, service provider B 110, for retransmission and reception by a pager 150 assigned to the subscriber. Thus, the subscriber may receive messages transmitted by both service provider A 105 and service provider B 110 while wearing a single pager.

Figure 2:
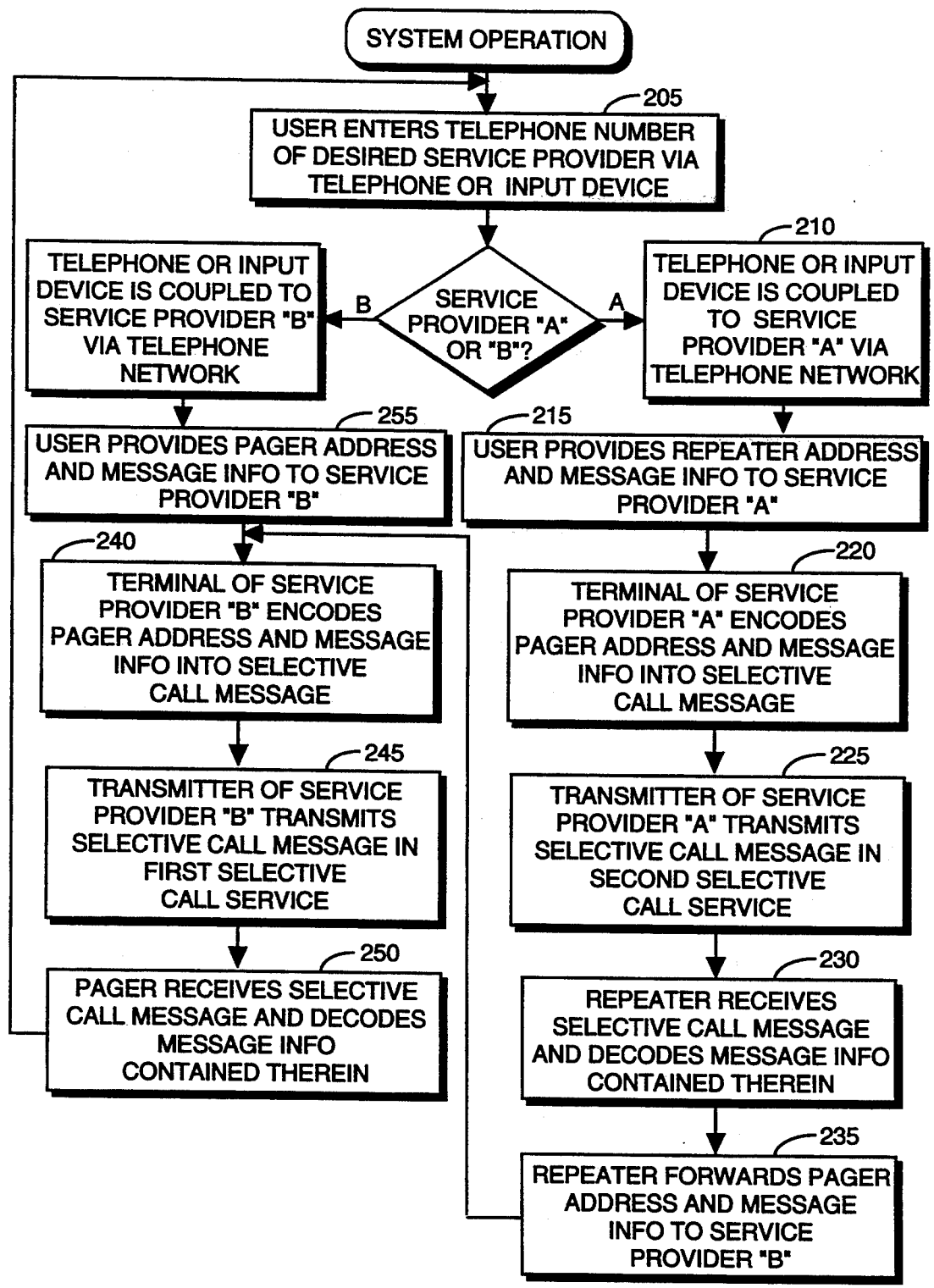
FIG. 2 is a flowchart illustrating the operation of the selective call system of FIG. 1 in accordance with the preferred embodiment of the present invention.

Referring next to FIG. 2, a process is depicted by which selective call messages broadcast by service provider A 105 (FIG. 1) may be forwarded to service provider B 110 by the personal paging repeater 155 located within the coverage area of service provider A 105. The initial step 205 in the process occurs when a user enters the telephone number of a service provider, for example, service provider A 105, into a telephone 115 (FIG. 1) or other input device 125, which is then coupled to service provider A 105 via a telephone network 135 at step 210. As mentioned above, the telephone network 135 may be either the public switched telephone network (PSTN) or a private telephone network, such as an "on-site" telephone network servicing employees of an office building. Alternatively, no telephone network may be necessary if users are able to directly contact service provider A 105. Thereafter, at step 215, the user inputs message information and, preferably, an address indicative of the personal paging repeater 155 (FIG. 1) located within the coverage area of service provider A 105. Alternatively, if the telephone number initially dialed by the user includes information by which the personal paging repeater 155 can be identified, the user may simply provide the message information to service provider A 105 at step 215. In either case, the message information and the address of the personal paging repeater 155 are encoded, at step 220, into a selective call message. Subsequently, at step 225, a transmitter 145 broadcasts the selective call message within the coverage area of service provider A 105 for reception, at step 230, by the personal paging repeater 155 (FIG. 1), which decodes the message information contained in the selective call message. Thereafter, at step 235, the personal paging repeater 155 forwards to service provider B 110 the message information and an address of a pager 150 (FIG. 1) located within the coverage area of service provider B 110, as will be described in detail below.

In accordance with the preferred embodiment of the present invention, once service provider B 110 has received the message information and the pager address, both are encoded, at step 240, into a selective call message which is transmitted, at step 245, within the coverage area of service provider B 110. If operating correctly and located within the coverage area of service provider B 110, the pager 150 receives the selective call message and decodes the message information contained therein at step 250.

In addition to providing message information to service provider A 105 for forwarding to service provider B 110, a user may further provide message information directly to service provider B 110. To do this, the user dials, at step 205, the telephone number of service provider B 110 prior to providing, at step 255, the message information and address of the pager 150 to service provider B 110. As described above, the message information and pager address is encoded and transmitted, at steps 240 and 245, as a selective call message for reception, at step 250, by the pager 150. Therefore, according to the present invention, a subscriber of both service provider A 105 and service provider B 110 may receive message information provided to either service provider 105, 110, even if the coverage areas of the service providers 105, 110 do not overlap. Furthermore, the subscriber only needs to carry one pager, whereas, in conventional selective call systems, he would have to carry a pager for each service to which he subscribed.

In the manner described in FIG. 2, a subscriber may receive message information provided to several service providers through utilization of multiple personal paging repeaters. In accordance with the preferred embodiment of the present invention, the subscriber wears a pager having an address corresponding to a first selective call service provided by a first service provider. For each additional service provider to which he subscribes, the subscriber utilizes a personal paging repeater, which is situated within the coverage area of the service provider, to forward selective call messages to the first service provider. For example, a subscriber of a first paging service, such as a private paging service which provides local service to a first office in which the subscriber normally works, may wish to also receive selective call messages broadcast by a second paging service providing local service to a second office to which the subscriber sometimes travels. Furthermore, the subscriber may wish to receive personal selective call messages broadcast by a third paging service, which family and friends of the subscriber may access over the PSTN. In this case, the subscriber may wear a single pager having an address corresponding to the first paging service. He then simply purchases or rents personal paging repeaters for placement in the coverage areas of the second and third paging services. The personal paging repeaters will thereafter forward selective call messages broadcast by the second and third paging services to the first paging service for retransmission thereby. In this manner, the subscriber not only is able to receive selective call messages from multiple service providers, but also avoids the inconvenience of carrying several pagers. Additionally, implementation of the present invention, unlike prior art selective call systems, allows the subscriber to receive all of his selective call messages even if each of the multiple service providers has a unique coverage area.

Figure 3:
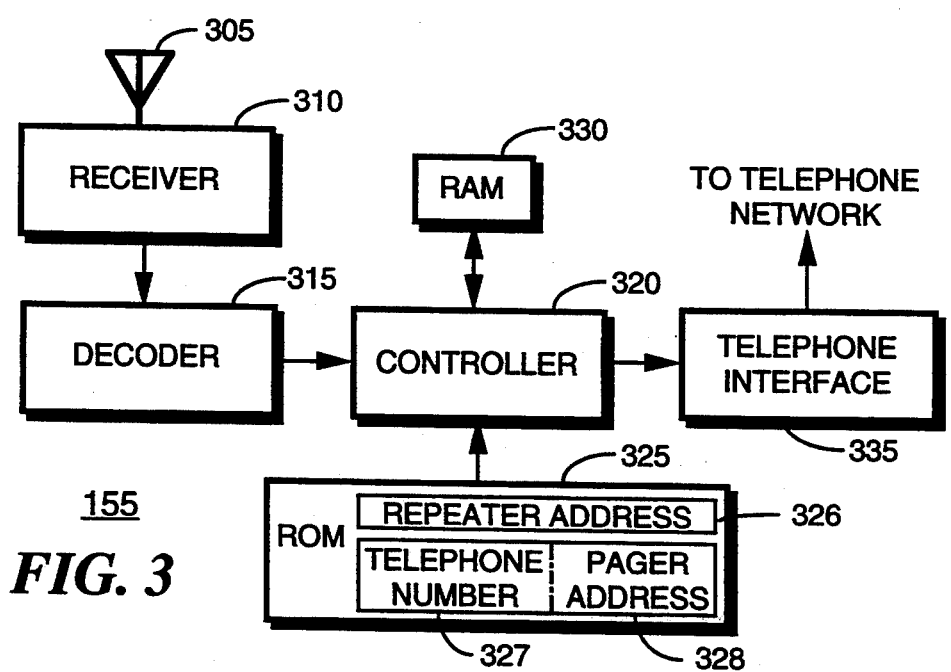
FIG. 3 is a block diagram of a personal paging repeater in accordance with the preferred embodiment of the present invention.

FIG. 3 is a block diagram of the personal paging repeater 155. In accordance with the preferred embodiment of the present invention, the personal paging repeater 155 is located within the coverage area of a service provider, for example, service provider A 105 (FIG. 1), to which the user of the personal paging repeater 155 subscribes. The personal paging repeater 155 receives a selective call message broadcast by service provider A 105 through use of an antenna 305. Thereafter, the selective call message is demodulated in a manner well known to one skilled in the art by a receiver 310 coupled to the antenna 305. A decoder 315 is coupled to the receiver 310 for decoding the selective call message to recover message information and an address, both of which are provided to a controller 320 for further processing.

In accordance with the preferred embodiment of the present invention, a ROM (read only memory) 325, which may include an EEPROM (electrically erasable programmable read only memory), is coupled to the controller 320 for storing subroutines controlling the operation of the personal paging repeater 155. The ROM 325 additionally stores a repeater address 326 which is assigned by service provider A 105 to the personal paging repeater. The repeater address 326 is compared by the controller 320 to the address contained in the selective call message, and, if the address contained in the selective call message is equivalent to the repeater address 326, the decoded message information is preferably stored in a RAM (random access memory) 330, also coupled to the controller 320.

Further coupled to the controller 320 is a telephone interface 335, such as a modem, by which the personal paging repeater 155 may be coupled to the telephone network 135 (FIG. 1) in response to reception of a selective call message intended for the personal paging repeater 155. Preferably, a telephone number 327, which is stored in the ROM 325 and is associated with the repeater address 326, is dialed by the telephone interface 335 to couple to another service provider, for example, service provider B 110 (FIG. 1), to which the user of the personal paging repeater 155 also subscribes. The controller 320 further provides the telephone interface 335 with the message information stored in the RAM 330 and, if necessary, a pager address 328 stored in the ROM 325 which is also associated with the repeater address 326. In accordance with the preferred embodiment of the present invention, the pager address 328 is indicative of the pager 150 (FIG. 1) utilized by the subscriber to receive selective call messages broadcast by service provider B 110. The telephone interface 335 thereafter provides the message information and the pager address 328 to service provider B 110 over the telephone network 135, as will be described in detail below.

Although the personal paging repeater 155 is described as having a single repeater address 326 assigned by service provider A 105, it may be appreciated by one skilled in the art that alternate embodiments of the present invention may provide for multiple repeater addresses, telephone numbers, and pager addresses. In this manner, the personal paging repeater 155 may receive, from service provider A 105, selective call messages intended for several different subscribers. Thereafter, the personal paging repeater 155 may forward different sets of message information, along with corresponding pager addresses, to another service provider, for example, service provider B 110. Additionally, the personal paging repeater 155 may forward different sets of messages information, along with corresponding pager addresses, to a plurality of other service providers.

Figure 4:
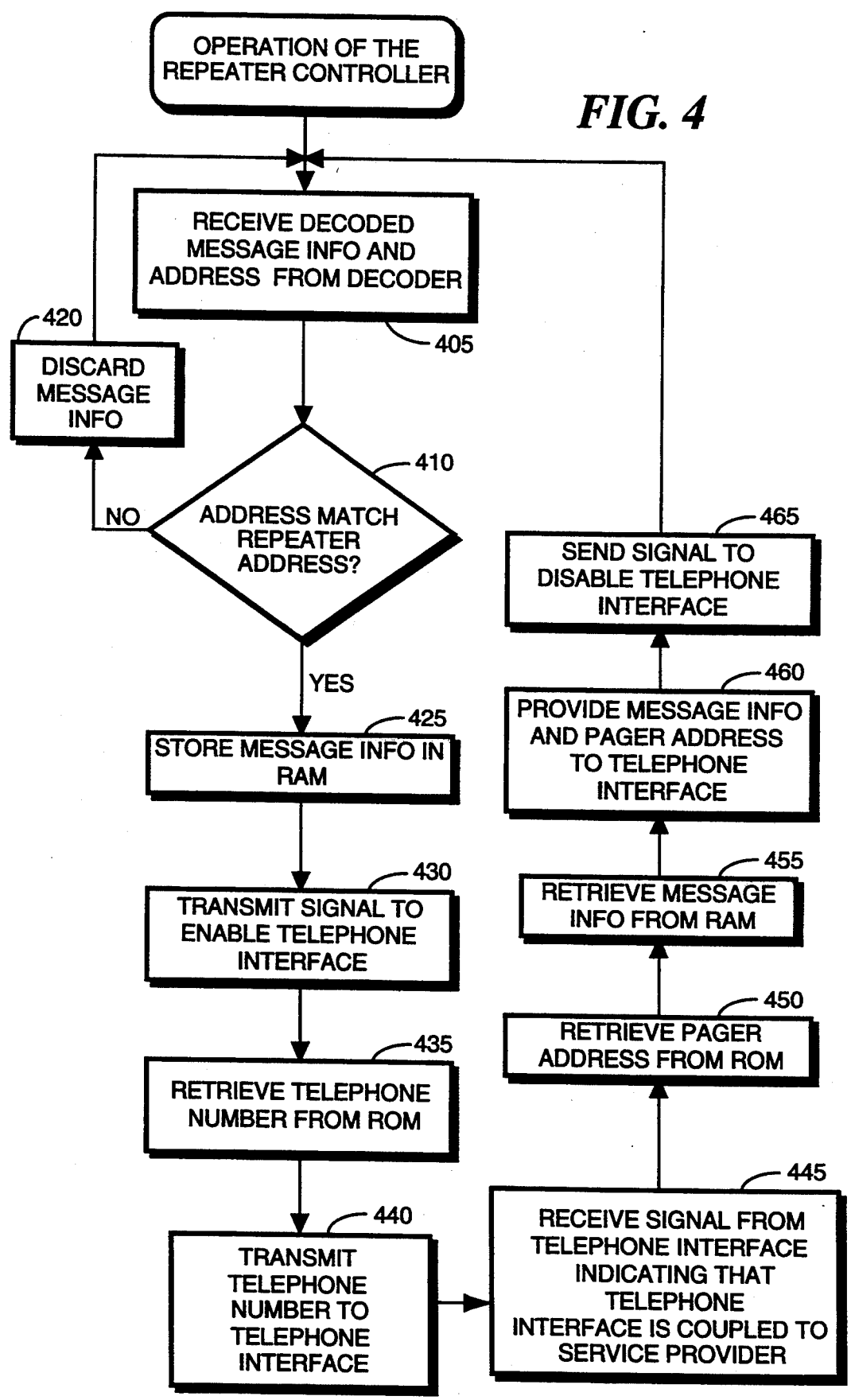
FIG. 4 is a flowchart illustrating the operation of a controller included in the personal paging repeater of FIG. 3 in accordance with the preferred embodiment of the present invention.

FIG. 4 is a flowchart of the operation of the controller 320 of the personal paging repeater 155 (FIG. 3). As described above, the controller 320 receives, at step 405, message information and an address decoded from a selective call message transmitted by service provider A 105 (FIG. 1). Thereafter, at step 410, the decoded address is compared to the repeater address 326 stored in the ROM 325 (FIG. 3). If the decoded address is not equivalent to the repeater address 326, the message information is discarded by the controller 320 at step 420. If the decoded address is equivalent to the repeater address 326, indicating that the selective call message is intended for reception by the personal paging repeater 155, the message information is stored in the RAM 330 at step 425.

In response to determining that the decoded address is equivalent to the stored address, the controller 320 sends a signal, at step 430, to the telephone interface 335 directing the telephone interface 335 to access the telephone network 135. Subsequently, at step 435, the controller 320 retrieves the telephone number 327 of service provider B 110 (FIG. 1) from the ROM 325 and provides, at step 440, the telephone number 327 to the telephone interface 335. Once the telephone interface 335 has dialed the telephone number 327, the controller 320 receives, at step 445, a signal from the telephone interface 335 indicating that the personal paging repeater 155 is coupled to service provider B 110. The controller 320 thereafter retrieves the pager address 328 from the ROM 325 and the message information from the RAM 330 at steps 450 and 455. According to the present invention, and as described above, the pager address 328 is indicative of the pager 150 utilized by the subscriber to receive selective call messages transmitted by service provider B 110. In alternate embodiments of the present invention, however, storage of the pager address 328 in the ROM 325, and therefore retrieval by the controller 320, is unnecessary if the telephone number 327 dialed by the telephone interface 335 contains information by which the pager 150 can be identified by service provider B 110, i.e., if the telephone number 327 is unique to the pager 150.

In accordance with the preferred embodiment of the present invention, the controller 320 provides, at step 460, the message information and the pager address to the telephone interface 335 for transmission to service provider B 110 over the telephone network 135. Thereafter, at step 465, the controller 320 sends a signal to the telephone interface 335 directing the telephone interface 335 to disconnect from the telephone network 135, thereby completing the forwarding process.

In summary, the personal paging repeater according to the present invention forwards selective call messages transmitted by a first selective call service provider to a second selective call service provider for subsequent retransmission in the coverage area of the second selective call service provider. Therefore, a subscriber of both selective call service providers may, while located in the coverage area of the second selective call provider, receive selective call messages transmitted by both selective call service providers. Furthermore, if the subscriber wishes to receive other selective call messages transmitted by additional selective call service providers, he may conveniently utilize additional personal paging repeaters, located in the coverage areas of the additional selective call service providers, to forward the other selective call messages to the second selective call service provider. In this manner, the subscriber is able to advantageously receive selective call messages initially transmitted by selective call service providers in whose coverage areas he is not present. Additionally, the subscriber can receive all of his selective call messages on a single pager, unlike prior art paging systems in which the subscriber is required to carry a pager for each selective call service to which he subscribes. As a result, through use of personal paging repeaters to forward his selective call messages, the subscriber avoids the inconvenience of carrying several pagers, each of which may be bulky and expensive.

It may be appreciated by now that there has been provided a method by which a subscriber of multiple selective call service providers having unique coverage areas may automatically receive messages broadcast by each of the multiple paging services at all times. Furthermore, the subscriber is able to receive the messages transmitted by each of the multiple selective call service providers on a single pager.

It may also be appreciated that the personal paging repeater may receive messages transmitted in a first paging protocol, such as POCSAG (Post Office Code Standardization Advisory Group), while the messages forwarded to the pager may be transmitted in a second paging protocol, such as GSC (Golay Sequencing Code). This is possible because the personal paging receiver in accordance with the preferred embodiment of the present invention decodes each selective call message to recover the original message information, which is thereafter forwarded to another paging service. As a result, the personal paging repeater is also able to function, in some instances, as a paging protocol converter since conventional paging protocols are essentially incompatible.

I claim:

1. A communication system comprising:
   a first selective call service havng a first coverage area in which a first selective call message is transmitted;
   a paging repeater located within the first coverage area for receiving and decoding the first selective call message to recover a first address and message information included therein wherein the paging repeater automatically transfers the message information and a second address over a telephone network in response to determining that the first address is equivalent to a predetermined address stored by the paging repeater, wherein the paging repeater can be physically relocated by the user, and wherein the paging repeater comprises means for connecting to and disconnecting from the telephone network by the user; and
   a second selective call service for receiving the message information and the second address from the telephone network and encoding the message information and the second address into a second selective call message for transmission within a second coverage area; and
   wherein the paging repeater comprises:
   a receiver for receiving the first selective call message;
   a decoder coupled to the receiver for decoding the first selective call message to recover the first address and the message information included therein;
   a memory coupled to the decoder for storing the predetermined address, the second address, and a predetermined telephone number;
   comparing means coupled to the decoder and the memory for comparing the first address to the predetermined address; and
   telephone accessing means coupled to the memory and the comparing means for dialing the predetermined telephone number and transferring the second address and message information over the telephone network in response to the comparing means determining that the first address is equivalent to the predetermined address, wherein the telephone accessing means can be disconnected from and recoupled to the telephone network by the user such that the paging repeater can be moved between different locations and connected to the telephone network at the different locations.

2. The communication system according to claim 1, wherein the comparing means is a controller.

3. The communication system according to claim 1, wherein the telephone accessing means comprises a modem having a telephone interface coupled thereto.

4. The communication system according to claim 1, wherein the memory is a read only memory.

5. The communication system according to claim 1, wherein the first address is equivalent to the second address.

6. The communication system according to claim 1, wherein the paging repeater can be disconnected from the telephone network by disconnecting from a telephone outlet, relocated, and reconnected to the telephone network by the user without intervention of a system operator by connecting to another telephone outlet.

7. A repeater for receiving a selective call message and transferring the message information contained therein, comprising:
   receiving means for receiving the selective call message, wherein the selective call message comprises message information and an address indicative of the repeater;
   decoder means coupled to the receiving means for decoding the address and message information contained in the selective call message;
   a memory coupled to the decoder means for storing a predetermined repeater address and a predetermined recipient address indicative of an intended recipient of the message information;

control means coupled to the decoder means and the memory for comparing the address contained in the selective call message with the predetermined repeater address;

a telephone interface coupled to the control means for transferring the predetermined recipient address and the message information to a telephone network by connecting to a telephone outlet to access the telephone network, wherein the telephone interface is activated by the control means in response to the control means determining that the address contained in the selective call message is equivalent to the predetermined repeater address; and wherein the repeater can be disconnected from the telephone outlet, relocated, and reconnected to the telephone outlet by the user.

8. The repeater of claim 7, wherein the repeater can be disconnected from the telephone outlet, relocated, and reconnected to the telephone outlet by the user without intervention by a system operator.

* * * * *